Oct. 6, 1953          P. ANTONIOLI, JR., ET AL          2,654,501
PRESSURE COOKER
Filed March 21, 1950                               3 Sheets-Sheet 2
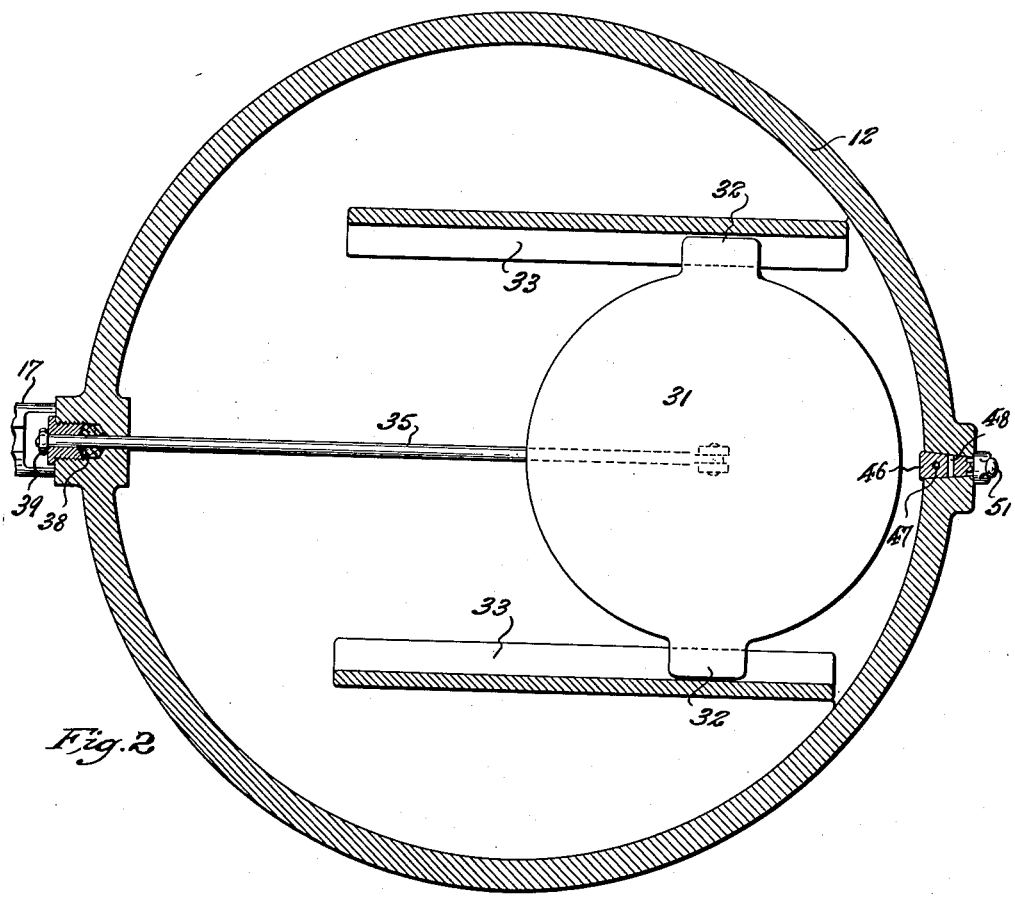
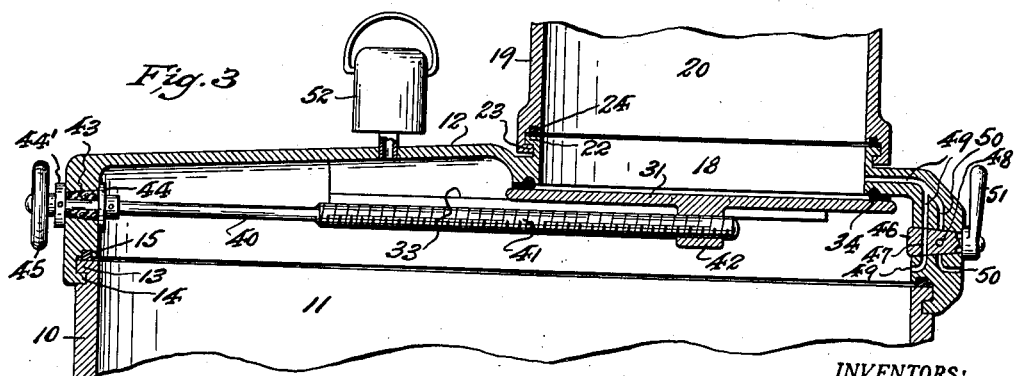
INVENTORS:
Peter Antonioli, Jr. &
BY Andrew Johnson,
George D. Richards
Attorney Oct. 6, 1953 P. ANTONIOLI, JR., ET AL 2,654,501
PRESSURE COOKER
Filed March 21, 1950 3 Sheets-Sheet 3
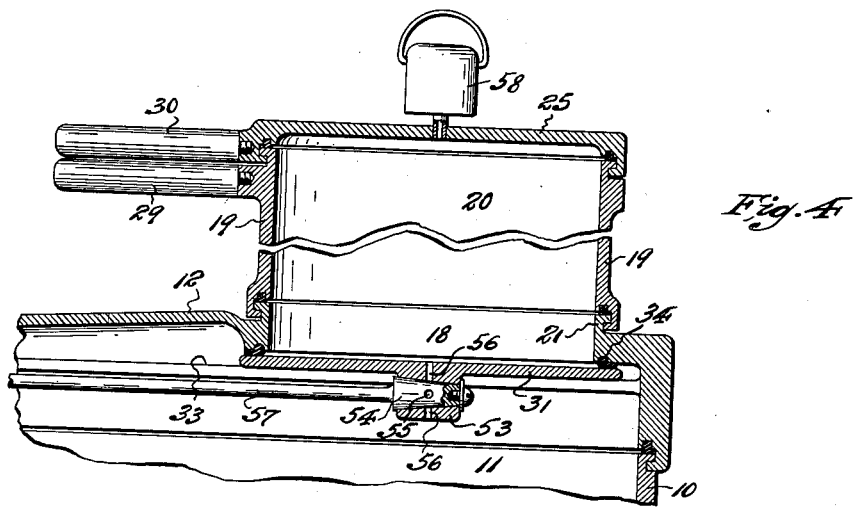
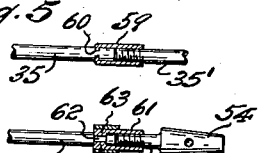
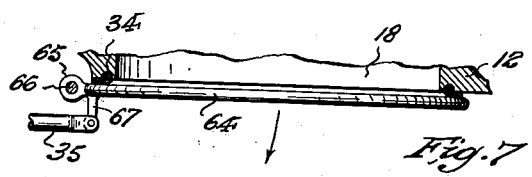
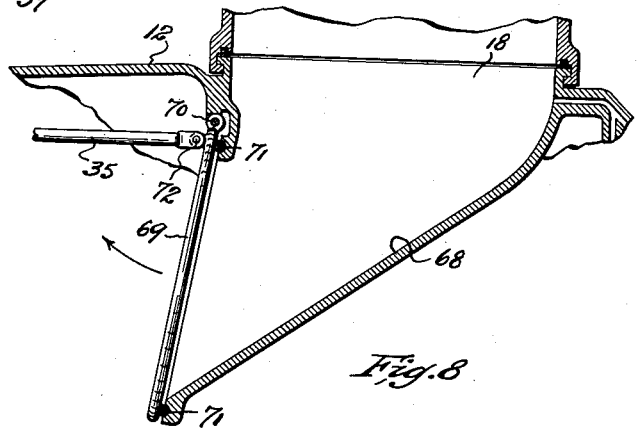
INVENTORS:
Peter Antonioli, Jr. &
BY Andrew Johnson
George D. Richards,
Attorney Patented Oct. 6, 1953

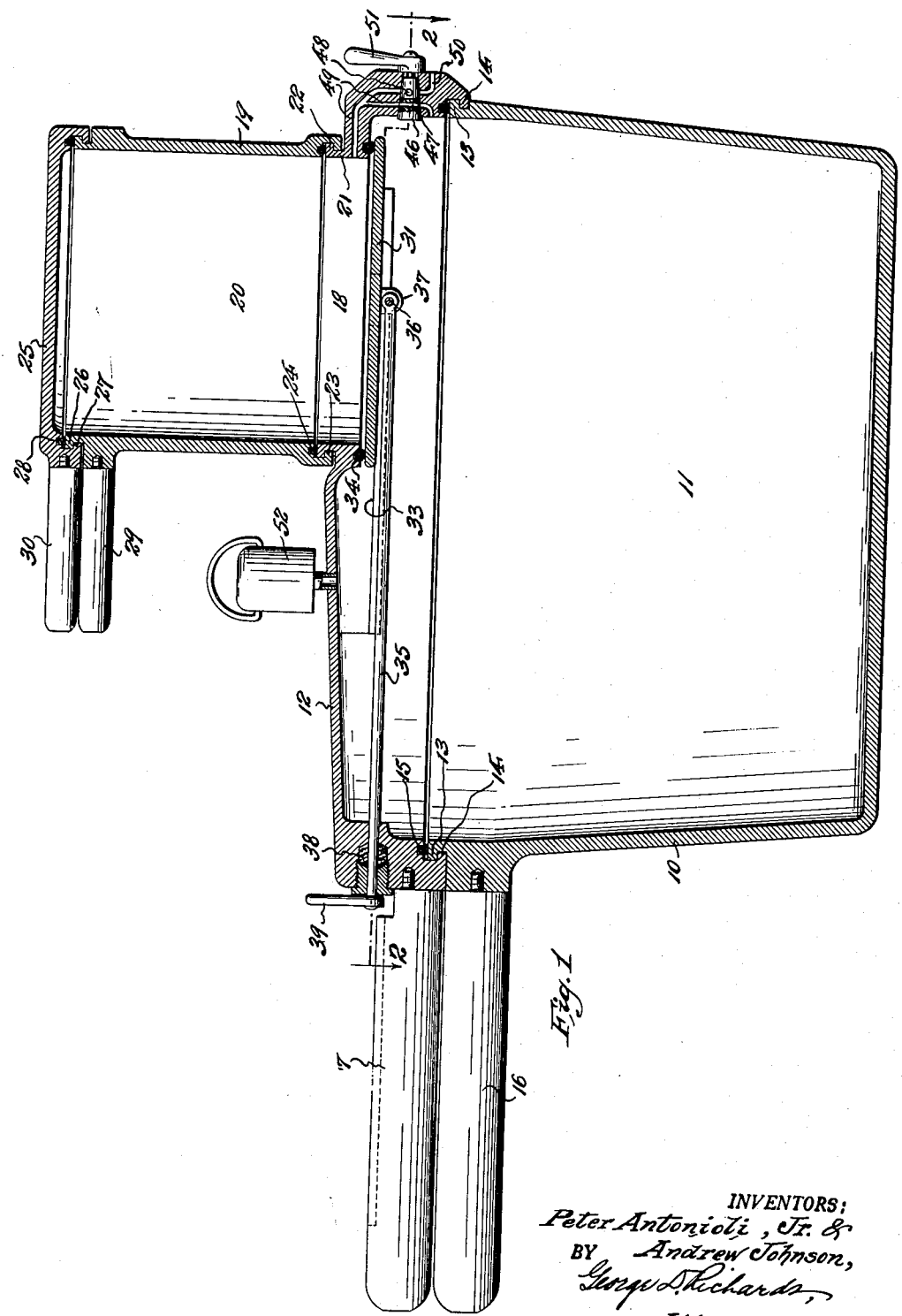

2,654,501

UNITED STATES PATENT OFFICE 2,654,501

PRESSURE COOKER

Peter Antonioli, Jr., and Andrew Johnson, Butte, Mont.

Application March 21, 1950, Serial No. 150,878

4 Claims. (Cl. 220—20.5)

This invention relates to improvements in pressure cookers.

The invention has for an object to provide a novel construction of pressure cooker having means whereby material can be introduced into the interior thereof during its use in a cooking operation without interrupting such operation, and in such manner that appreciable loss of heat and internal steam pressure is avoided; all whereby quick cooking material can be added to slow cooking material after desired cooking progress of the latter material has been attained.

The invention has for a further object to provide in cooperative relation to the main body compartment or chamber of a pressure cooker a second compartment or chamber to which access can be had without opening the main compartment or chamber; manipulatable means being provided for opening and closing communication between said second compartment or chamber and the main compartment or chamber for transfer of material from the former to the latter; and manipulatable valve means being provided for opening and closing steam communication between the main compartment or chamber and said second compartment or chamber at will.

Other objects and advantages of the invention will become apparent as the following specification is read in connection with the accompanying drawings, in which:

Fig. 1 is a vertical longitudinal sectional view of a pressure cooker illustrating one embodiment of the present invention; and Fig. 2 is a horizontal sectional view of the same, taken on line 2—2 in Fig. 1.

Fig. 3 is a fragmentary vertical longitudinal sectional view of a pressure cooker illustrating another embodiment of the present invention.

Fig. 4 is a fragmentary vertical longitudinal sectional view of a pressure cooker illustrating still another embodiment of the present invention.

Figs. 5 and 6 are fragmentary views in part section of means for detachably coupling the gate plate of the pressure cooker to means for manipulating the same.

Fig. 7 is a fragmentary sectional view of a modified construction of the gate plate of the pressure cooker; and Fig. 8 is also a fragmentary sectional view of another modified form and arrangement of gate plate as cooperative with a chute structure disposed between the second compartment or chamber and the main body compartment or chamber of a pressure cooker according to this invention.

Similar characters of reference are employed in the above described views, to indicate corresponding parts.

In Figs. 1 and 2, the illustrative embodiment of this invention therein shown comprises an upwardly open main body 10, the interior of which provides the main compartment or chamber 11 of the pressure cooker. The open top of the main body 10 is adapted to be closed by a detachable cover 12. Said main body 10 and cover 12 are respectively provided with cooperative interlocking lugs 13 and 14, whereby, in cooperation with a sealing gasket 15, to releasably secure the cover and the body together in leak-proof closed relation. Through the use of this type of securing means, the joint is not only effectively sealed against steam leakage but also will resist outward pressure caused by steam generation, which is an essential requirement in pressure cooker construction. Cover 12 may thus be termed briefly a "sealable cover," which means that it is removable or openable but has associated structural means of some suitable and well known type for securing it to body 10 in a pressure-resistant, hermetically sealed manner when in applied position. The cover 12 is provided with a suitable safety and pressure relief valve device 52 of any well known type.

The body 10 and cover 12 are preferably respectively provided with handle extensions 16 and 17, by means of which the pressure cooker can be manipulated to open and close the main compartment or chamber 11 thereof.

The cover 12 is provided with an opening or hatchway 18. Upstanding from the cover 12, in axially aligned relation to the opening or hatchway 18, is an endwise open auxiliary body 19, the interior of which provides a second compartment or chamber 20, which for convenience in distinguishing the same from the main compartment or chamber 11, is hereinafter referred to as the induction chamber. Said auxiliary body 19 may be formed as an integral part of the cover 12, but preferably is arranged to be a separable part thereof as shown, and to this end the cover 12 is provided with an external coaming 21 extending around the margin of the opening or hatchway 18. Said coaming 21 and the lower end of the auxiliary body 19 are respectively provided with cooperative interlocking clamping lugs 22—23, whereby, in cooperation with a sealing gasket 24, to releasably secure the auxiliary body 19 to the cover 12 in leak-proof sealed and pressure-resistant relation.

The open top of the auxiliary body 19 is adapted to be closed by a detachable, sealable cover 25. Said auxiliary body 19 and cover 25 are respectively provided with cooperative interlocking lugs 26—27, whereby, in cooperation with a sealing gasket 28, to releasably secure the cover 25 and auxiliary body 19 together in leak-proof sealed and pressure-resistant relation. The auxiliary body 19 and its cover 25 are preferably respectively provided with handle extensions 29—30, by means of which the cover 25 may be manipulated for opening or closing the auxiliary body 19.

Mounted within the cover 12 is a gate plate 31 which can be manipulated to open and close the opening or hatchway 18, and thus to open and close communication between the induction chamber 20 and the compartment or chamber 11 of the main body 10 of the pressure cooker. In the form and arrangement thereof which is shown in Figs. 1 and 2, said gate plate 31 is slidably supported, by diametrically disposed and oppositely extending runner lugs 32, upon rail ledges 33 which are provided in connection with the internal or underside of the main cover 12. Preferably, these rail ledges 33 are slightly upwardly inclined in their approach to the opening or hatchway 18 whereby, as the gate plate 31 is moved into register with and so as to close the opening or hatchway 18, the same will be pressed upwardly toward and into tight sealing engagement with an annular sealing gasket 34 with which the interior of the cover 12 is provided in surrounding relation to said opening or hatchway 18.

One means for manipulating the gate plate 31, as shown in Figs. 1 and 2, comprises a slidable actuating rod 35, to the inner end of which the gate plate is suitably connected, as e. g. by a cross-pin 36 supported by ears 37 depending from the under side of the gate plate. The outer portion of the actuating rod 35 projects exteriorly from the cover 12 through a packed stuffing box 38. Affixed to the outer extremity of the actuating rod is a handle 39 of suitable design. It will be obvious that when outpulling force is applied to the actuating rod 35, the gate plate will be caused to slide on the rail edges 33 away from the opening or hatchway 18, thus opening communication between the induction chamber 20 and the main body compartment or chamber 11. By pushing the actuating rod inward, the gate plate can be returned to its closed and sealed relation to the opening or hatchway 18, thus closing communication between the induction chamber 20 and the main body compartment or chamber 11.

Another means for manipulating the gate plate 31 is shown in Fig. 3, and comprises a rotatable actuating shaft 40 having a screw-threaded section 41 at its inner portion which is threaded through an internally screw-threaded lug 42 that projects from the underside of the gate plate 31. The outer end portion of shaft 40 is journaled in a packed bearing 43 with which the cover 12 is provided. The actuating shaft is retained against axial movement by inner and outer collars 44 and 44' which are suitably affixed thereto. Secured on the outer extremity of the actuating shaft 40 is a hand-wheel 45 by which it can be rotated. By rotating the actuating shaft in one direction, the threaded lug 42 is caused to travel outwardly on the screw-threaded section 41, thus sliding the gate plate to open position. Reverse rotation of the actuating shaft causes the threaded lug to travel inwardly on the screw-threaded section 41, thus sliding back the gate plate to closed and sealed relation to the opening or hatchway 18.

Means is provided for opening and closing steam communication between the main body compartment or chamber 11 and the induction compartment or chamber 20. One means for this purpose, as shown in Figs. 1 and 2, comprises a two way valve device which is mounted in the rim portion of the cover 12. This valve device comprises a rotatable tapered valve plug 46 having spaced transverse ports 47 and 48 disposed in right angular relation one to the other. Provided in the rim portion of the cover 12 is a steam flow duct 49 with which the valve plug port 47 is aligned. The lower end of duct 49 communicates with the main compartment or chamber 11 at a point below the gate plate 31, and the upper end of duct 49 communicates with the induction chamber 20 above the gate plate 31. Leading from the upper end portion of duct 49 is a branch duct 50 with which the valve plug port 48 is aligned. The upper end of branch duct 50 communicates with the induction chamber 20, and the lower end of branch duct 50 extends to the outer periphery of the rim portion of the cover 12 and thus communicates with the atmosphere. Affixed to the outer end of valve plug 46 is a finger piece 51 by which the same can be manipulated.

In the use of the pressure cooker of this invention, assuming that material, such as slow cooking food, is undergoing the cooking operation within the main compartment or chamber 11, and that the gate plate 31 is in closed and sealed relation to the induction chamber 20, and the valve plug 46 is turned to close the steam flow duct 49, under these circumstances, heat applied to the pressure cooker will develop steam pressure within the compartment or chamber 11 so that the cooking of the material contained therein will be in progress. Assuming now that it is desired to introduce additional material into the compartment or chamber 11 without interrupting the cooking operation in progress therein. To accomplish this, the cover 25 of the auxiliary body 19 is removed, and the additional material is deposited within the induction chamber 20, whereafter the cover 25 is replaced to close and seal said induction chamber 20. The valve plug 46 is thereupon turned to close the branch duct 50 and open the duct 49, thus admitting steam from the main compartment or chamber 11 into the induction chamber 20 so that steam pressure is equalized on both sides of the gate plate 31. These conditions having been established, the gate plate 31 can now be withdrawn from its closed relation to the opening or hatchway 18, thus opening the latter for the passage therethrough of the added material from the induction chamber 20 into the main compartment or chamber 11. After the added material is thus deposited within the compartment or chamber 11, the gate plate 31 is returned to its closed position and the valve plug 46 is turned to close the duct 49 and open the branch duct 50, thus venting steam from the induction chamber 20 to the atmosphere, whereby pressure within the induction chamber is relieved, so that the pressure of steam within the main compartment or chamber 11 thrusts against the underside of the closed gate plate and thus further urges the latter into tight sealed engagement with the sealing gasket 34.

It may be desired to effect separate cooking of the added material within the induction chamber 20, instead of introducing said material into the main compartment or chamber 11. If so, this may be done by leaving the gate plate 31 in partially open or cracked position and manipulating the valve plug 46 to close the branch duct 50 and open the duct 49, thus admitting steam under pressure into the induction chamber 20 so that the added material will be subjected to the cooking effect thereof, and at the same time permitting draining of any condensation in chamber 20 back to main chamber 11. If it is desired to use the main body 10 of pressure cooker independently of the auxiliary body 19, the latter can be removed from the main cover 12, and the auxiliary body cover 25 then applied to the latter to close and seal the opening or hatchway 18 thereof.

Referring now to Fig. 4 of the drawings, there is shown therein a modified embodiment of the pressure cooker of this invention, wherein instead of providing the steam control valve device in the rim of the cover 12 as above described, the steam valve device is incorporated in the gate plate. In this arrangement, the gate plate 31 is provided with a valve housing boss 53 dependent from its underside. Extending through said housing boss 53, for rotation therein, is a tapered valve plug 54 having a transverse port 55 which is in line with a steam flow duct 56 disposed to extend upwardly through said housing boss 53 and the gate plate 31, whereby the lower end of said duct communicates with the main compartment or chamber 11, and the upper end of said duct communicates with the induction chamber 20. Extending from said valve plug 54 is a slidable and rotatable actuating rod 57. Sliding manipulation of rod 57 serves to move the gate plate for opening or closing the same. Rotatable manipulation of rod 57 serves to turn the valve plug 54 to open and close the steam flow duct 56. In connection with this arrangement, the cover 25 of the auxiliary body 19 is provided with a suitable safety and pressure relief valve 58 of any well known type. In the use of this modified embodiment of the invention, to introduce additional material into the main compartment or chamber 11, the gate plate 31 being closed and the valve plug 54 disposed to close the duct 56, the cover 25 is removed and the material to be added is deposited in the induction chamber 20, whereafter the cover 25 is replaced to close said induction chamber. The actuating rod 57 is now rotated a quarter turn to register the valve plug port 55 with the duct 56, thus admitting steam from the main compartment or chamber 11 into the induction chamber 20, thereby equalizing steam pressure on both sides of the closed gate plate 31. This having been done, the actuating rod 57 is pulled outwardly to open the gate plate 31 so that the additional material may pass from the induction chamber 20 into the main compartment or chamber 11, whereafter the gate plate is again closed. After this the relief valve 58 may be opened to vent steam from the induction chamber 20, so that steam pressure in the main compartment or chamber 11 will further urge the gate plate into tightly sealed engagement with the sealing gasket 34.

It may be desired to provide means for detachably coupling the gate plate 31 to its actuating rod. If so, any suitable coupling means for such purpose may be provided. For example, as shown in Fig. 5, the actuating rod 35 of Fig. 1 may be provided with a separable section 35′ joined to the main section by a coupling or union 59, into which the separable section 35′ is threaded. Said coupling or union 59 and main section 35 are provided with cooperative clutch means 60 by which the same are joined. By way of further example, as shown in Fig. 6, the actuating rod 57 may likewise be provided with a separable section 57′ extending from the valve plug 54 and threaded into a coupling or union 61. Said rod 57 is provided with a flattened neck 62 adapted to be non-rotatably engaged by clutch jaws 63 with which the coupling or union 61 is provided, whereby both axial and rotative movement of the actuating rod 57 can be transmitted through the coupling or union to the separable section 57′, so that sliding movement of said rod will move the gate plate to and from closed position, and rotative movement of said rod will turn the valve plug 54 as desired.

In the above described embodiments of the pressure cooker of this invention, the gate plate is of a sliding type and arrangement; it will be understood however that the gate plate may optionally be provided of hinged or swinging type and arrangement. For example, as shown in Fig. 7, the arrangement comprises a gate plate 64 having a hinging member 65 pivotally supported by a hinge pin or pintle 66. Provided in connection with the hinged side of the gate plate 64 is a bell-crank arm 67 to which the actuating rod 35 is connected. In this arrangement, the gate plate can be down-swung from its closed relation to the opening or hatchway 18 to an open position by suitable manipulation of the actuating rod 35.

In another arrangement shown in Fig. 8, the cover 12 is provided with a downwardly inclined chute section 68 which leads from the opening or hatchway 18. Cooperative with the open free end of said chute section 68 is a swingable gate plate 69 which is hinged to the cover 12 at 70. The rim surrounding the open end of the chute section 68 is provided with a sealing gasket 71 engageable by the gate plate 69 when the latter is closed. The actuating rod 35 is pivotally connected at 72 with the gate plate, whereby said rod, when properly manipulated, may be caused to open and close the gate plate 69.

It will be understood that various changes and modifications, in addition to those already pointed out, may be made in the above described pressure cooker structures without departing from the scope of the invention as defined in the following claims. It is therefore intended that the matter described in the foregoing specification and shown in the accompanying drawings shall be interpreted as illustrative and not in a limiting sense.

We claim:

1. A portable cooking utensil of the pressure cooker type comprising an upwardly open main body, the interior of which provides a main cooking chamber, a removable main cover adapted to close and seal the open top of said main body, an upwardly open auxiliary body connected with and opening downwardly through an opening in said main cover, the interior of said auxiliary body providing an induction chamber, a second removable cover to close and seal the open top of said auxiliary body, a movable gate plate carried by said main cover to cooperate with said opening therethrough for opening and closing communication between the main body interior and the auxiliary body interior, means also carried by said main cover to extend from said gate plate exteriorly of said main cover and manipulatable to optionally move said gate plate to closed or open position, means to provide a steam flow communication between the interiors of said main and auxiliary bodies, and a valve means cooperative with said steam flow communication means and manipulatable to open and close the latter.

2. A portable cooking utensil of the pressure cooker type according to claim 1, wherein the means to provide steam flow communication includes a main passage extending through the wall of the main cover between the interiors of said main and auxiliary bodies and having a branch passage to provide communication between the interior of the auxiliary body and the atmosphere, and wherein the valve means is provided with ports respectively cooperative with said main and branch passages and operative to close one thereof when the other thereof is open.

3. A portable cooking utensil of the pressure cooker type according to claim 1, wherein the main cover is provided with an internal trackway means by which the gate is slidably supported for movement to closed or open position.

4. A portable cooking utensil of the pressure cooker type according to claim 1, including means to removably couple said auxiliary body in sealed joint connection to said main cover, said second removable cover being applicable to said main cover, upon removal of said auxiliary body therefrom, to close and seal the opening therethrough.

PETER ANTONIOLI, Jr.
ANDREW JOHNSON.

References Cited in the file of this patent

UNITED STATES PATENTS

| Number | Name | Date |
|---|---|---|
| 159,817 | Gray | Feb. 16, 1875 |
| 183,554 | Flanders | Oct. 24, 1876 |
| 340,995 | Forshaw | May 4, 1886 |
| 564,128 | Twyman | July 14, 1896 |
| 605,397 | Couper | June 7, 1898 |
| 702,597 | Salmon | June 17, 1902 |
| 933,052 | Bohan | Sept. 7, 1909 |
| 1,091,055 | French | Mar. 24, 1914 |
| 1,407,965 | Ware | Feb. 28, 1922 |
| 1,795,016 | Faber | Mar. 3, 1931 |
| 1,882,781 | Davidson | Oct. 18, 1932 |

FOREIGN PATENTS

| Number | Country | Date |
|---|---|---|
| 501,822 | Germany | July 8, 1930 |